United States Patent
Jacob

(10) Patent No.: US 7,127,504 B2
(45) Date of Patent: Oct. 24, 2006

(54) SYSTEM AND METHOD OF APPLYING POWER LAWS IN OPTIMIZING NETWORK TRAFFIC

(75) Inventor: Ovid Jacob, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 820 days.

(21) Appl. No.: 10/302,314

(22) Filed: Nov. 21, 2002

(65) Prior Publication Data

US 2004/0103187 A1    May 27, 2004

(51) Int. Cl.
    G06F 15/173    (2006.01)
(52) U.S. Cl. .................. 709/223; 370/229; 370/235; 455/453; 709/220; 718/102; 718/105
(58) Field of Classification Search .............. 370/229, 370/235; 455/453; 709/220, 223; 718/102, 718/105
    See application file for complete search history.

(56) References Cited

U.S. PATENT DOCUMENTS

| | | | |
|---|---|---|---|
| 6,223,205 B1 | 4/2001 | Harchol-Balter et al. | |
| 6,370,584 B1 | 4/2002 | Bestavros et al. | |
| 6,397,252 B1 | 5/2002 | Sadiq | |
| 6,947,381 B1* | 9/2005 | Wen et al. | 370/231 |
| 7,032,119 B1* | 4/2006 | Fung | 713/320 |

OTHER PUBLICATIONS

Hodges et al. Workload Characterization and Performance Evaluation in a Research Environment. ACM. 1982. pp. 39-50.*
Crovella et al. Self-Similarity in World Wide Web Traffic: Evidence and Possible Causes. IEEE/ACM Transactions on Networking. vol. 5. No. 6. Dec. 1997.*
Gribble et al., "Self-Similarity in File Systems", 1998, *SIGMETRICS*.
Diane Banegas, "The Tree of Life Scientists Model Nature's System of Fractal-branching Networks", 1997, *SFI Bulletin*.
Geoffrey B. West, James H. Brown, Brian J. Enquist, "A General Model for the Origin of Allometric Scaling Laws in Biology", 1997, *Science*, vol. 276.
Mark E. Crovella, Azer Bestavros, "Self-Similarity in World Wide Web Traffic: Evidence and Possible Causes", 1997, *IEEE/ACM Transactions on Networking*, vol. 5.
Vern Paxson and Sally Floyd, "Wide Area Traffic: The Failure of Poisson Modeling", 1995, *IEEE*.
Will E. Leland, Murad S. Taqqu, Walter Willinger, Daniel V. Wilson, "On the Self-Similar Nature of Ethernet Traffic (Extended Version)", 1994, *IEEE/ACM Transactions on Networking*, vol. 2.

* cited by examiner

*Primary Examiner*—Rupal Dharia
*Assistant Examiner*—Grant Ford
(74) *Attorney, Agent, or Firm*—Martine Penilla & Gencarella, LLP

(57) ABSTRACT

A system and method of predicting network data traffic includes coupling a first group of clients to a current server that results in a current CPU utilization of the current server. A second group of clients are coupled to the current server. A load multiple is determined and the current CPU utilization is compared to a predicted CPU utilization. A server requirement is increased if the current CPU utilization is greater than or equal to the predicted CPU utilization.

16 Claims, 4 Drawing Sheets

SYSTEM AND METHOD OF APPLYING POWER LAWS IN OPTIMIZING NETWORK TRAFFIC

BACKGROUND OF THE INVENTION

1. Field of the Invention

The present invention relates generally to systems and methods for managing data networks, and more particularly, to methods and systems for managing network data traffic.

2. Description of the Related Art

Computer networks are very common. Computer networks can be small local area networks (LAN) connecting only a few computers or can be wide area networks (WAN) connecting an entire enterprise of multiple LANs. The Internet can also be considered as a very large WAN. As the number of computers and users on the network increases then the network data traffic will also increase. As the network data traffic increases then "choke" points can develop at a network node where data flow is restricted due to some shortfall in that node. The choke point slows down the data traffic. For example, a server is used to serve data to requesting clients via the computer network that interconnects the server and the clients. As the number of clients increases, the volume of data being served by the server also increases. Eventually, the volume of data being requested by the clients becomes greater than the volume of data the server can serve in a timely manner. As a result, the server delays sending the requested data and the data throughput of the network is choked by the limited data throughput capability of the server. Similarly, any other node can become a choke point when the output demands on the node become greater than the output capabilities of the node. A properly designed network minimizes choke points so as to maximize data flow. In addition an accurate understanding of network data traffic allows the network data traffic to be distributed more evenly across servers, routers and other network nodes.

Traditionally, network traffic predictions have been based on a Poisson distribution pattern. A Poisson distribution is a probability density function that is often used as a mathematical model of the number of outcomes obtained in a suitable interval of time and space. A poison distribution has its mean equal to its variance, that is used as an approximation to the binomial distribution, and that has the form of:

$$f(x)=e^{-\mu}\mu^x/x!$$ Formula 1 where $\mu$ is the mean and x takes on nonnegative integral values.

FIGS. 1A, 1B and 1C show a typical Poisson distribution pattern of data traffic 100 in a network at three different time bases. FIG. 1A shows the data traffic 100 at a one hundred second time base. The data shown appears to be approximately uniform in density (measured in packets/unit time on the Y-axis) and frequency (on the X-axis) therefore resulting in a generally uniform appearing graph with no significant peaks or valleys.

FIG. 1B shows the same data traffic 100 with a time base of one second having approximately the same pattern. Again the data traffic shown in FIG. 1B appears to be approximately uniform in density and frequency therefore resulting in a uniform appearing graph but with what appears to be very minor peaks and valleys that are very closely spaced.

FIG. 1C shows the same data traffic 100 with a time base of 0.01 second that shows some periodic variations in the data distribution such as periodic peaks 110A, 110B and periodic valleys 112A, 112B.

In sum, a Poisson distribution appears approximately uniform at a large time base (e.g., one hundred seconds) with some periodic peaks and valleys at a relatively small time base (e.g., 0.01 seconds).

When a network is being designed, a Poisson pattern is traditionally used to model the predicted data traffic in the network. The Poisson model has also been used when managing and operating networks such as to determine optimum times for back-up and network interruption for repairs or identify network nodes needing improvement so as to avoid a choke point developing. An accurate data traffic pattern projection can also provide insight into other aspects of the network operations such as load balancing and other operations.

However, actual studies of actual network data traffic show the data traffic actually follows a pattern that has peaks and valleys at any time base rather than a Poisson pattern as shown in FIGS. 1A–C above. For example, one study by Will E. Leland, Murad S. Taqqu, Walter Willinger, and Daniel V. Wilson, and entitled "On the Self-Similar Nature of Ethernet Traffic (Extended Version)", IEEE/ACM Trans. Networking, Vol. 2., pp. 1–15, January 1994 (hereafter referred to as Leland) is incorporated by reference herein in its entirety for all purposes. Leland examined data packet traffic flow in an Ethernet LAN.

FIGS. 2A and 2B show a graph 200 of the data packet traffic flow that Leland actually measured at different time bases. FIG. 2A shows the graph 200 with a time base of one hundred seconds. Even at a one hundred second time base, significant peaks 210A, 210B, 210C, 210D and valleys 212A, 212B, 212C, 212D are evident. As the time base is decreased to 0.01 seconds, in FIG. 2B, significant peaks 210E, 210F, 210G, 210H and valleys 212E, 212F, 212G, 212H are also shown. Because the presence of peaks 210A–H and valleys 212A–H are constant, regardless of the time base, the patterns can also be said to be self-similar in that they have approximately the same form regardless of time base.

Another study of interest is by Vern Paxson and Sally Floyd, and entitled "Wide Area Traffic: The Failure of Poisson Modeling", IEEE/ACM Trans. Networking, Vol. 3, pp. 226–244, June 1995 (hereafter referred to as Paxson) which is incorporated by reference herein in its entirety for all purposes. Paxson examined WAN network traffic. Paxson also found that Poisson was not sufficiently accurate model of packet data transfer, which makes up the bulk of WAN data traffic. Paxson also identified a bursty (i.e., having peaks and valleys), self-similar pattern to the packet data transfer through the WAN which is similar to the data traffic flow wave forms found by Leland above.

A study of Internet packet data traffic by Mark E. Crovella and Azer Bestavros, and entitled "Self-Similarity in WWW traffic: Evidence and Possible Causes," IEEE/ACM Trans. Networking, Vol. 5, pp 835–846, December 1997, (Crovella), is incorporated by reference herein in its entirety for all purposes. Crovella found that packet data traffic on the world wide web also followed a bursty, self-similar pattern and not a Poisson pattern.

Each of the studies (Leland, Paxson and Crovella) showed that Poisson models do not accurately represent or predict actual packet data flow patterns. In view of the foregoing, there is a need for a system and method of more accurately predicting network data traffic.

SUMMARY OF THE INVENTION

Broadly speaking, the present invention fills these needs by providing a system and method for predicting and managing network data traffic. It should be appreciated that the present invention can be implemented in numerous ways, including as a process, an apparatus, a system, computer readable media, or a device. Several inventive embodiments of the present invention are described below.

One embodiment provides a system and method of predicting network data traffic includes coupling a first group of clients to a current server that results in a current CPU utilization of the current server. A second group of clients are coupled to the current server. A load multiple is determined and the current CPU utilization is compared to a predicted CPU utilization. A server requirement is increased if the current CPU utilization is greater than or equal to the predicted CPU utilization.

The load multiple can be equal to a sum of the first plurality of client nodes and the second plurality of client nodes divided by the first plurality of client nodes.

The predicted CPU utilization can be equal to an inverse of a product of the first plurality of client nodes and the load multiple to a scaling exponent. The scaling exponent can be equal to a multiple of about ⅓. The scaling exponent can be equal to about ⅓.

Increasing the server requirement can include adding additional server CPU capacity. Adding additional server CPU capacity can include adding additional server CPU capacity until the current CPU utilization is greater than the predicted CPU utilization.

Coupling a first group of clients to the current server can include receiving a first group of requests from the first group of clients. Coupling a second group of clients to the current server can include receiving a second group of requests from the second group of clients.

Increasing the server requirement can include outputting the predicted CPU utilization.

Another embodiment includes a method of predicting network data traffic that includes coupling a first group of client nodes to a current server and coupling a second group of client nodes to the current server. A load multiple is determined. The load multiple is equal to a sum of the first group of client nodes and the second group of client nodes divided by the first group of client nodes. A current CPU utilization of the current server is compared to a predicted CPU utilization. The predicted CPU utilization is equal to an inverse of a product of the first group of client nodes and the load multiple to a ⅓ exponent. A server requirement is increased if the current CPU utilization is greater than or equal to the predicted CPU utilization.

Another embodiment includes a system for managing network data traffic and includes a server system that is coupled to a computer network. A first group of clients are coupled to the network. A second group of clients are also coupled to the network. A load managing device is coupled to the network. The load managing device includes logic that determines a current CPU utilization of the server system and logic that determines a load multiple. The load managing device also includes logic that compares the current CPU utilization to a predicted CPU utilization and logic that increases a server requirement if the current CPU utilization is greater than or equal to the predicted CPU utilization.

The logic that increases the server requirement can include logic that adds additional server CPU capacity. The logic that increases the server requirement can include logic that couples at least one additional server to the network.

The logic that adds additional server CPU capacity can also include logic that adds additional server CPU capacity until the current CPU utilization is greater than the predicted CPU utilization.

The load managing device can also include logic that receives a first group of requests from the first group of clients and logic that receives a group plurality of requests from the second group of client nodes.

The logic that increases the server requirement can also include logic that outputs the predicted CPU utilization.

The present invention provides the advantage of a more accurate prediction or model of data traffic than prior art methods. The increased accuracy can provide improved network management capabilities and thereby enhance network planning, performance and design.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments of systems and methods of predicting network data traffic using a power law will now be described. It will be apparent to those skilled in the art that the present invention may be practiced without some or all of the specific details set forth herein.

Prior art network traffic models are based upon a Poisson distribution theory. As described above in FIGS. 1A–2B, several studies have found that the Poisson distribution-based model is not an accurate representation of actual network data flow. Actual network data flow traffic patterns were bursty and self-similar rather than Poisson-like distribution. Self-similarity can indicate a long-range correlation. Long-range correlations can often be described by a power law-type relationship. One embodiment includes a precise power law model that can be used to accurately represent network data traffic.

Figure 3:
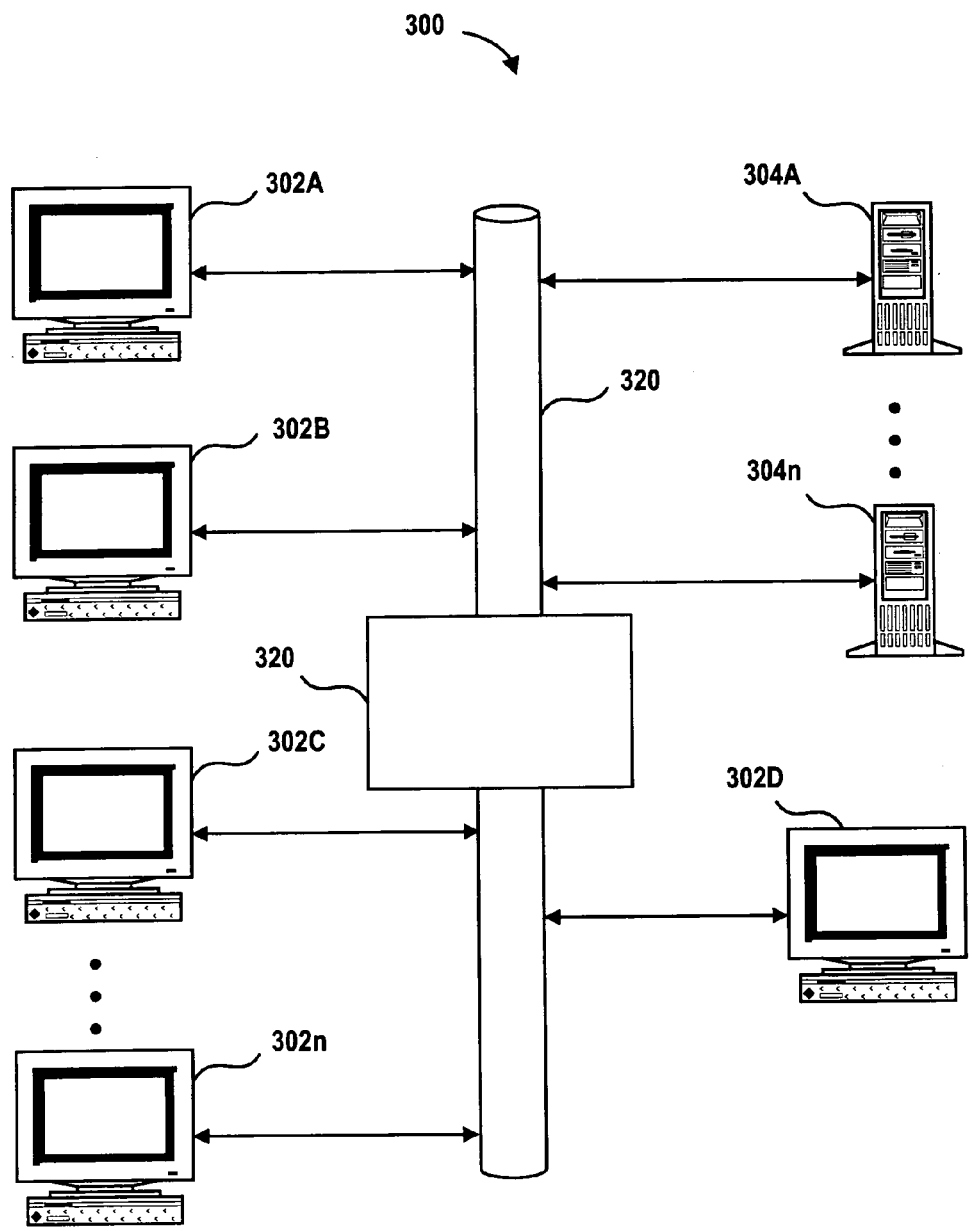
FIG. 3 shows a computer local area network (LAN) according to one embodiment of the present invention.

FIG. 3 shows a computer local area network (LAN) 300 according to one embodiment of the present invention. The LAN 300 includes a network 310 that couples the workstations (i.e., clients) 302A–n and the servers 304A to 304n. Additional servers and workstations may also be used and the network 310 may also include connection to a larger WAN and/or the Internet. The network can also include intermediary points such as hubs, switches, routers and other nodes.

For purposes of modeling data traffic, each workstation 302A–n can be said to demand approximately the same amount of data via the network 310. Therefore the data demands of each workstation 302A–n can be described as being invariant.

The statistical study of a mechanical system, near a phase transition shows several interesting features. First, the degrees of freedom change in number and nature. Second phase transitions of second kind discontinuities are observed in extensive quantities. Third, renormalization schemes can be developed to compute observable behavior. Fourth, there are universal critical exponents that define the behavior of the system at criticality.

As the system approaches criticality, the system displays long-range correlations, as well as self-similarity. In view of the second feature, the observable change their functional dependence from a falling exponent to a power law. The existence of critical exponent of a universal nature indicates the power law that describes the system can have a relatively simple form.

In a study of complex biological network systems by Geoffrey B. West, James H. Brown, Brian J. Enquist, entitled "A General Model of Allometric Scaling in Biology," Science, Vol. 276, p. 122, 1997 (West) found that many such biological supply systems (e.g., a blood stream) have an allometric scaling. West's study found that a biological variable Y depends on the body mass M in an allometric scaling relationship described by the following formula:

$$Y = cM^\beta \qquad \text{Formula 2}$$

Where $\beta$ is a scaling exponent and c is a constant that depends on characteristics of then particular organism. If this relationship reflected geometric constraints then $\beta$ is a simple multiple of $1/3$. However, West found that in biological systems the power (i.e., exponent) $\beta$ is a simple multiple of $1/4$.

West illustrates that a power law relationship having the exponent $\beta$ is a simple multiple of $1/4$, if three simple assumptions are taken: First, that a space-filling fractal branching pattern is required for the system to supply the entire volume of the organism. Second, the final branch of the system is a size-invariant unit. Third, the energy required to distribute the resources is minimized. Following West's analyses, is typical lengths $l_k$ and radii $r_k$ for the branches of the system, the volume rate of flow is defined by the following Formula 3:

$$(\delta Q_0)/(\delta t) = \pi r_k^2 u_k \qquad \text{Formula 3}$$

Where $u_k$ is the average flow velocity. Each level k has nk branches, so at each level the total number of branches is $N_k = n_0 n_1 \ldots n_k$. The terminal units are size invariant and are defined by radius $r_c$, length $l_c$ and average flow velocity $u_c$ and number $N_c$. West further shows that:

$$(\delta Q_0)/(\delta t) = B = M^a = N_k(\delta Q_0)/(\delta t) = N_k \pi r_k^2 u_k = r_c^2 u_c \qquad \text{Formula 4}$$

So that $N_c = M^a$. West then introduced scale factors $\delta_k = (r_{k+1})/r_k$ and $\gamma_k = (l_{k+1})/l_k$. For self-similar fractals, $\delta_k = \delta$, $\gamma_k = \gamma$ and $N_k = n^k$, so $N_c = n^n$.

The behavior of total volume $V_b$ in the biological system can be characterized by the following relationships:

$$V_b = \Sigma_k N_k V_k = \Sigma_k \pi r_k^2 l_k n_k = N_c \pi r_c^2 u_c \qquad \text{Formula 5}$$

$$V_b = V_0/(1-n\gamma\delta^2) = V_c(\gamma\delta^2)^{-N}/(1-n\gamma\delta^2) \qquad \text{Formula 6}$$

Since it can be shown that $V_b = M$, therefore $(\gamma\delta^2)^{-N} = M$ and $a = -\ln(n)/\ln(\gamma\delta^2)$.

The existence of a space filling system implies that the size of the system can be described by $l_k \gg r_k$ and a volume of the $k^{th}$ level is equal to $4/3\pi(l_k/2)^3 N_k$.

Energy minimization can imply that the flow is volume preserving or area preserving. Volume preserving for space filling system provides the following relationship:

$$4/3\pi(l_k/2)^3 N_k = 4/3\pi(l_{k+1}/2)^3 N_{k+1} \qquad \text{Formula 7}$$

Further, since $(\gamma_k)^3 = \{(l_{k+1})/l_k\}^3 = N_k/N_{k+1} = 1/n$, therefore $\gamma_k = n^{-1/3} = \gamma$.

However, an area preserving flow has a different implication. Because $\pi r_k^2 = n \pi r_{k+1}^2$ or $\delta_k = (r_{k+1})/r_k = n^{-1/2} = \delta$, $\gamma = n^{-1/2}$. This implies with $\gamma = n^{-1/3}$, that $a = 3/4$ and $B = M^{3/4}$, $r_0 = M^{3/8}$, $l_0 = M^{1/4}$.

According to West's theory, biological systems are area preserving and therefore the biological system scales with multiples of $1/4$.

A computer network (such as computer network 300) is a network of servers, clients, switches, routers and hubs with ports $p_k$. Signals are transported by this network from one node to another node. To supply all of the nodes with signal, the network can be described as having a fractal branching pattern. The fractal branching of the network 300 can be characterized as being linear preserving of nodes or hops $h_k$, meaning that the data travels through the least number of nodes and hops. Each of the final branches of the network 300 (e.g., workstations 302A–302n, or other end port) has substantially the same data throughput and therefore the energy required to distribute the data traffic on the network 300 is minimized.

The existence of a fractal pattern implies that the network 300 can be described by the relationship of $h_k \gg p_k$. The fractal pattern is linear preserving in nodes (somewhat analogous to area preserving in a biological system above) and the total number of nodes at the $k^{th}$ level is $p_k N_k$. Therefore: $p_k N_k = p_{k+1} N_{k+1}$ and $\gamma_k = (l_{k+1})/l_k = N_k/N_{k+1} = 1/n$, therefore $\gamma_k = n^{-1} = \gamma$.

Line preserving flow also minimizes the energy required to distribute the data signal implies for hops $h_k = n h_{k+1}$, or $\delta_k = (h_{k+1})/h_k = n^{-1} = \delta$. When combined with $\gamma = n^{-1}$ from above, this provides a relationship of $a = 1/3$ and $Y = N^{1/3} p_0 = N^{1/3}$, $h_0 = N^{1/3}$.

Thus, a quantity Y depends on the number of hosts in the network proportional to the $1/3$ power of those nodes. Therefore, in one embodiment, the average amount of traffic at a given node $p_0$ is proportional to a similar quantity of the total number of nodes to the $1/3$ power.

Figure 1A:
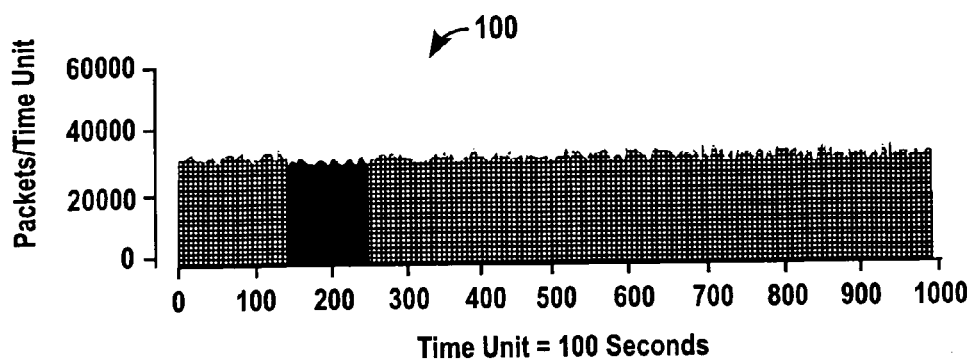
FIG. 1A shows the data traffic at a one hundred second time base.
Figure 1B:
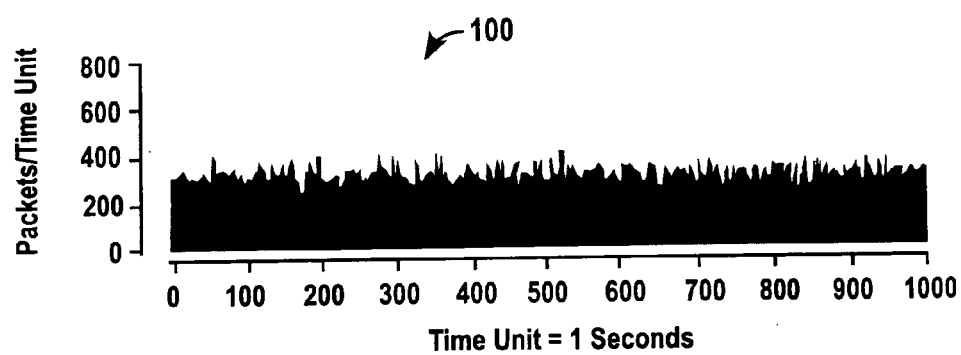
FIG. 1B shows the same data traffic as shown in FIG. 1A with a time base of one second having approximately the same pattern.
Figure 1C:
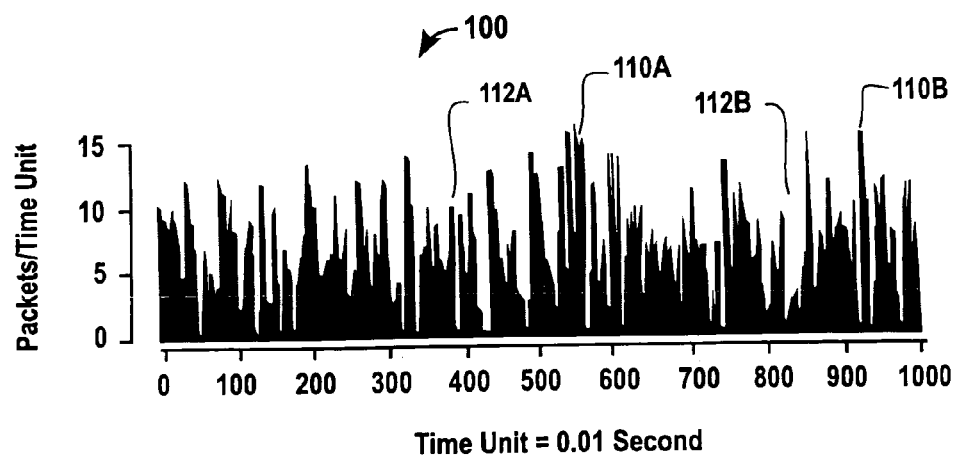
FIG. 1C shows the same data traffic as shown in FIGS. 1A and 1B above, with a time base of 0.01 second.
Figure 2B:
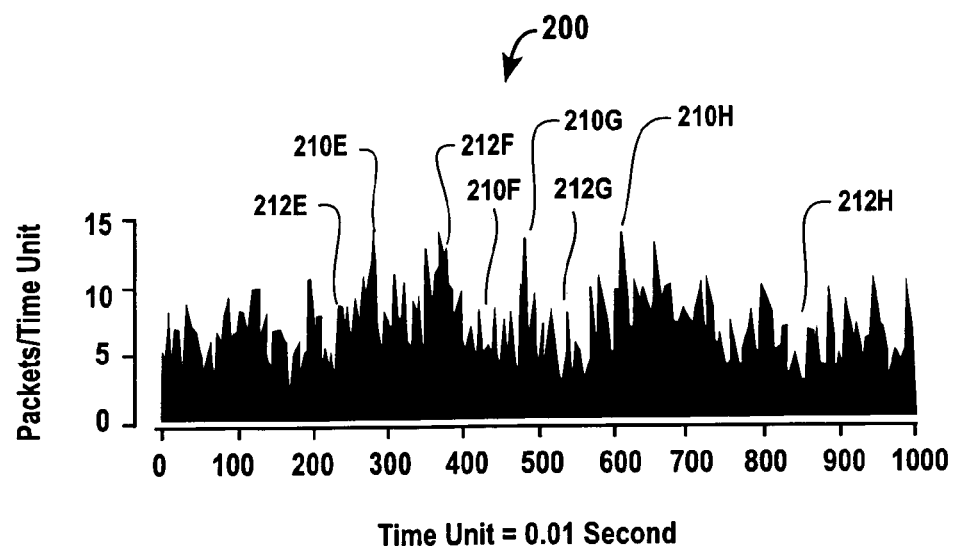
FIG. 2B shows the graph the data traffic shown in FIG. 2A with a time base of 0.01 seconds.
Figure 2A:
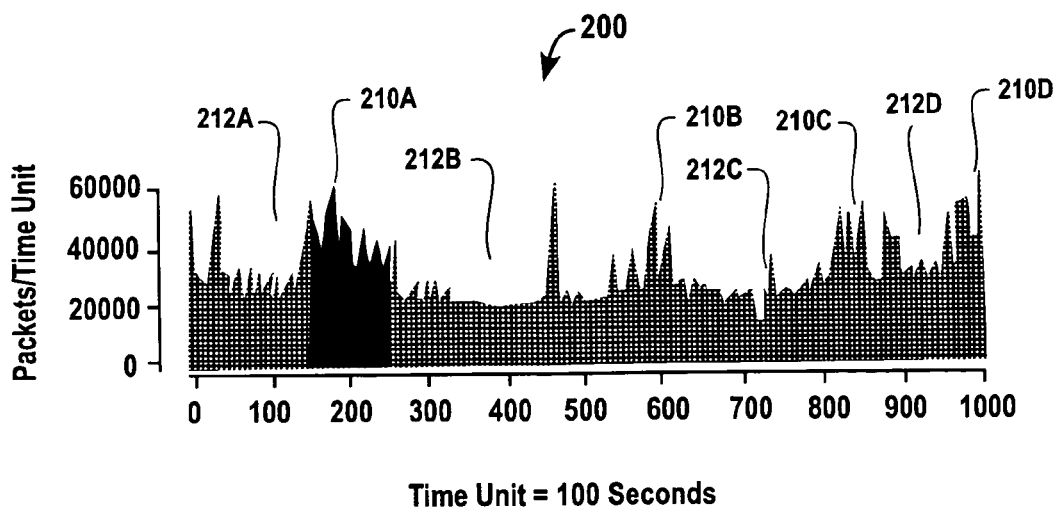
FIG. 2A shows the graph of another set of data traffic with a time base of one hundred seconds.

Referring again to the data gathered by Paxson, as discussed above, the data is well described by $-1/3$. Similarly, the data produced by Crovella, as also discussed above, $\beta = 1/3$ for all file transfers and $\beta = 2/3$ for all text transfers accurately describes the observed data traffic. LAN traffic can also be accurately described or predicted by this model as the data collected by Leland, as shown in FIGS. 2A–2B above, can be described by an auto-correlation of $\beta = 1/3$.

A computer network, such as computer network 300, can be viewed as having the following properties: First, the network 300 is a self-similar fractal network that can be described by a fractal pattern and this fractal pattern is linear-preserving in the ports; Second, each final branch (i.e., clients 302A–n) of the network 300 is throughput invariant (i.e., passes approximately the same quantity of data); Third, that is also linear-preserving. One embodiment provides that network dependant quantities scale as multiples of ⅓ power of the number of nodes in the network 300.

$$Y = cN^\beta \quad \text{Formula 8}$$

Where Y is the load, c is a constant, N is the number of hosts (i.e., IP addresses or nodes) on the network, and β is a scaling exponent. The scaling exponent β is a multiple of ⅓. More generally stated, if the number of a number of nodes increases by a factor F, a more accurate prediction of the actual traffic load increase can be described as $F^\wedge ⅓$. Therefore, as long as the CPU utilization on the servers is less than $1/F^\wedge ⅓$, additional servers are not required to support the projected additional load.

Referring again to FIG. 3 above, if device 320 is an OSI level 4 device and receives packets from N nodes on the network. The device 320 directs the traffic received to one or more servers 304A–n, depending on the load. In one embodiment, the servers 304A–n are include load balancing capabilities such as using a round robin load balancing technique or any other load balancing method. If the number of nodes N double (i.e., 2N), the load (Y) will only grow by $2^\wedge ⅓$, or a factor of about 1.26 as described in the above Formula 8. Therefore, if the existing servers can support about 126% of the current traffic load, then no additional servers are required. However, if the existing servers cannot support 126% of the current traffic load, then additional servers may be required to balance the load.

In an alternative view, if the server CPU utilization is less than about 79% (the inverse of 1.26), then additional servers are not necessary. However, if the CPU utilization is about 79% or greater, then additional servers are required to support the projected load caused by doubling the number of nodes.

Figure 4:
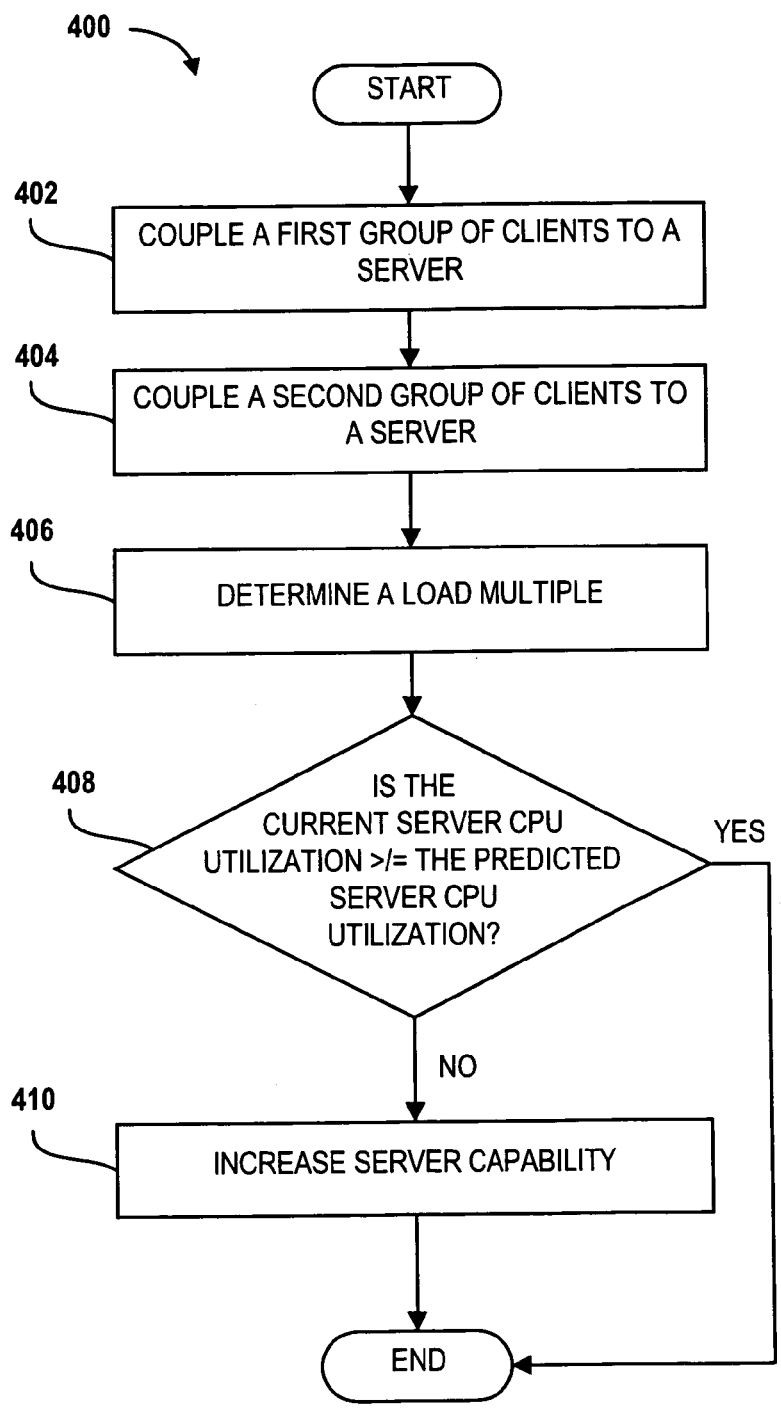

FIG. 4 is a flowchart of the method operations 400 of predicting network data traffic according to one embodiment of the present invention. In operation 402, a first group of clients (e.g., client nodes, nodes, etc) are coupled to a server. The demand from the first group of clients results in a current or baseline CPU utilization of the server.

In operation 404, a second group of clients are coupled to the server. Coupling a first group of clients to the current server can include receiving a first group of requests from the first group of clients. Coupling a second group of clients to the current server can include receiving a second group of requests from the second group of clients.

In operation 406 a load multiple is determined. The load multiple can be equal to a sum of the first group of clients and the second group of clients divided by the first group of clients.

In operation 408 the current CPU utilization is compared to a predicted CPU utilization. The predicted CPU utilization can be equal to an inverse of a product of the first plurality of client nodes and the load multiple to a scaling exponent. The scaling exponent can be equal to a multiple of about ⅓. The scaling exponent can be equal to about ⅓.

In operation 410, a server requirement is increased if the current CPU utilization is not greater than or equal to the predicted CPU utilization and the method operations end. Increasing the server requirement can include adding additional server CPU capacity such as coupling additional servers (i.e., distributed server system) to the network to meet the client's demands. Alternatively, the additional proportions of server CPU can be reserved for meeting the demands of the clients. Adding additional server CPU capacity can also include adding additional server CPU capacity until the current CPU utilization is greater than the predicted CPU utilization. Increasing the server requirement can include outputting the predicted CPU utilization so that a network administrator/manager can be notified that the server is a choke point in the computer network design.

If, in operation 410, the current CPU utilization is greater than or equal to the predicted CPU utilization, then no action is required and the method operations end.

While FIG. 4 describes an exemplary embodiment of identifying a server as a choke point, it should be appreciated that similar methods and operations can be utilized to identify any other portion or component in the computer network that may be a choke point. Similarly, the systems and methods described herein can also be used in conjunction with computer network design and simulation software to identify potential choke points and other design shortfalls.

As used herein the term "about" means +−10%. By way of example, the phrase "about 250" indicates a range of between 225 and 275.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of predicting network data traffic comprising:
    coupling a first plurality of client nodes to a current server resulting in a current CPU utilization of the current server;
    coupling a second plurality of client nodes to the current server;
    determining a load multiple;
    comparing the current CPU utilization of the current server to a predicted CPU utilization equal to an inverse of a product of the first plurality of client nodes and the load multiple to a scaling exponent of between about ⅓ and about ⅔ power; and increasing a server requirement if the current CPU utilization of the current server is greater than or equal to the predicted CPU utilization.

2. The method of claim 1, wherein the load multiple is equal to a sum of the first plurality of client nodes and the second plurality of client nodes divided by the first plurality of client nodes.

3. The method of claim 1, wherein the scaling exponent is equal to about ⅔ for text file transfers.

4. The method of claim 1, wherein the scaling exponent is equal to about ⅓ for all file transfers.

5. The method of claim 1, wherein increasing the server requirement includes adding additional server CPU capacity.

6. The method of claim 1, wherein coupling a first plurality of client nodes to the current server includes receiving a first plurality of requests from the first plurality of client nodes and wherein coupling a second plurality of client nodes to the current server includes receiving a second plurality of requests from the second plurality of client nodes.

7. The method of claim 1, wherein increasing the server requirement includes outputting the predicted CPU utilization.

8. A method of predicting network data traffic comprising:
    coupling a first plurality of client nodes to a current server;
    adding a second plurality of client nodes to the current server;
    determining a load multiple that is equal to a sum of the first plurality of client nodes and the second plurality of client nodes divided by the first plurality of client nodes;
    comparing a current CPU utilization of the current server to a predicted CPU utilization equal to an inverse of a product of the first plurality of client nodes and the load multiple to a ⅓ power; and
    increasing a server requirement if the current CPU utilization of the current server is greater than or equal to the predicted CPU utilizaton.

9. A system for managing network data traffic comprising:
    a server system coupled to a computer network;
    a first plurality of clients coupled to the network;
    a second plurality of clients coupled to the network;
    a load managing device coupled to the network, the load managing device including:
        logic that determines a current CPU utilization of the server system;
        logic that determines a load multiple;
        logic that compares the current CPU utilization of the server system to a predicted CPU utilization equal to an inverse of a product of the first plurality of client nodes and the load multiple to a scaling exponent of between about ⅓ and about ⅔ power; and
        logic that increases a server requirement if the current CPU utilization of the server system is greater than or equal to the predicted CPU utilization.

10. The system of claim 9, wherein the load multiple is equal to a sum of the first plurality of clients and the second plurality of clients divided by the first plurality of clients.

11. The system of claim 9, wherein the scaling exponent is equal to about ⅔ for text file transfers.

12. The method of claim 9, wherein the scaling exponent is equal to about ⅓ for all file transfers.

13. The system of claim 9, wherein logic that increases the server requirement includes logic that adds additional server CPU capacity.

14. The system of claim 13, wherein logic that increases the server requirement includes logic that couples at least one additional server to the network.

15. The system of claim 9, wherein the load managing device includes:
    logic that receives a first plurality of requests from the first plurality of clients; and
    logic that receives a second plurality of requests from the second plurality of client nodes.

16. The system of claim 9, wherein the logic that increases the server requirement includes logic that outputs the predicted CPU utilization.

* * * * *